(12) United States Patent
Senda et al.

(10) Patent No.: US 8,171,908 B2
(45) Date of Patent: May 8, 2012

(54) ENGINE START SYSTEM FOR USE IN IDLE STOP SYSTEM FOR AUTOMOTIVE VEHICLE

(75) Inventors: Takashi Senda, Niwa-gun (JP); Akira Kato, Anjo (JP); Kazushige Okumoto, Kariya (JP); Mitsuhiro Murata, Niwa-gun (JP); Masami Niimi, Handa (JP); Kiyokazu Haruno, Anjo (JP)

(73) Assignee: Denso Corporation, Kariya (JP)

( * ) Notice: Subject to any disclaimer, the term of this patent is extended or adjusted under 35 U.S.C. 154(b) by 303 days.

(21) Appl. No.: 12/585,202

(22) Filed: Sep. 8, 2009

(65) Prior Publication Data

US 2010/0059007 A1 Mar. 11, 2010

(30) Foreign Application Priority Data

Sep. 8, 2008 (JP) ................................. 2008-229885
Feb. 27, 2009 (JP) ................................. 2009-045433

(51) Int. Cl.
*F02N 11/08* (2006.01)
*F02N 15/00* (2006.01)
(52) U.S. Cl. .................................. 123/179.4; 290/38 E
(58) Field of Classification Search ............... 123/179.3, 123/179.4; 290/38 R, 38 E
See application file for complete search history.

(56) References Cited

U.S. PATENT DOCUMENTS

| | | | | |
|---|---|---|---|---|
| 4,415,812 A | * | 11/1983 | Griffith et al. ............... | 290/38 R |
| 5,265,706 A | * | 11/1993 | Iga ................................... | 192/42 |
| 6,308,674 B1 | * | 10/2001 | Ruehle et al. ............... | 123/179.3 |
| 6,354,257 B1 | * | 3/2002 | Marshall et al. ........... | 123/179.3 |
| 6,634,332 B2 | * | 10/2003 | Saito et al. .................. | 123/179.3 |
| 6,651,603 B2 | * | 11/2003 | Osada et al. ............... | 123/179.3 |
| 7,275,509 B2 | * | 10/2007 | Kassner ..................... | 123/179.25 |
| 7,665,438 B2 | * | 2/2010 | Hirning et al. ............. | 123/179.3 |
| 7,954,469 B2 | * | 6/2011 | Park et al. ................. | 123/179.25 |
| 2002/0043947 A1 | * | 4/2002 | Saito et al. ..................... | 318/430 |
| 2005/0099009 A1 | * | 5/2005 | Spellman et al. ........... | 290/38 R |

(Continued)

FOREIGN PATENT DOCUMENTS

DE 100 59 902 A1 6/2002

(Continued)

OTHER PUBLICATIONS

European Search Report dated Nov. 1, 2010 in corresponding European Patent Application No. 09 011 450.5.

(Continued)

*Primary Examiner* — Stephen K Cronin
*Assistant Examiner* — Arnold Castro
(74) *Attorney, Agent, or Firm* — Oliff & Berridge, PLC

(57) ABSTRACT

An engine start system which may be employed in automotive idle stop systems. The engine start system includes a pinion gear to be pushed to a ring gear coupled to an engine for achieving meshing engagement with the ring gear. After the pinion gear engages the ring gear, the engine start system starts to rotate the pinion gear using a starter motor to crank the engine. Specifically, when an engine restart request is made following an engine stop request, the engine start system waits until after the speed of the engine drops below a preselected gear engagable speed and then moves the pinion gear toward the ring gear without rotating the pinion gear. This minimizes the consumption of fuel in the vehicle in supplying electric power to the starter motor and a maximum level of mechanical noise arising from the engagement of the pinion gear with the ring gear.

8 Claims, 7 Drawing Sheets

U.S. PATENT DOCUMENTS

| | | | |
|---|---|---|---|
| 2007/0137602 A1* | 6/2007 | Kassner | 123/179.25 |
| 2008/0053777 A1* | 3/2008 | Kamei et al. | 192/45 |
| 2008/0127927 A1* | 6/2008 | Hirning et al. | 123/179.3 |
| 2008/0162007 A1* | 7/2008 | Ishii et al. | 701/54 |
| 2009/0020091 A1* | 1/2009 | Botzenhard et al. | 123/179.3 |
| 2009/0224557 A1* | 9/2009 | Reynolds et al. | 290/38 R |
| 2009/0320644 A1* | 12/2009 | Farrar et al. | 74/7 C |
| 2010/0050971 A1* | 3/2010 | Park et al. | 123/179.25 |
| 2011/0174255 A1* | 7/2011 | Neuburger et al. | 123/179.4 |

FOREIGN PATENT DOCUMENTS

| | | |
|---|---|---|
| DE | 10 2005 049 092 A1 | 4/2007 |
| JP | Y2-56-42437 | 10/1981 |
| JP | A-9-256935 | 9/1997 |
| JP | A-2000-314364 | 11/2000 |
| JP | A-2001-317439 | 11/2001 |
| JP | A-2001-525037 | 12/2001 |
| JP | A-2003-65191 | 3/2003 |
| JP | A-2003-083212 | 3/2003 |
| JP | A-2003-214305 | 7/2003 |
| JP | A-2003-301765 | 10/2003 |
| JP | B2-3551783 | 8/2004 |
| JP | A-2005-330813 | 12/2005 |
| JP | A-2007-107527 | 4/2007 |
| JP | B2-4029891 | 1/2008 |
| JP | A-2008-510099 | 4/2008 |
| JP | B2-4083268 | 4/2008 |
| JP | B2-4108140 | 6/2008 |
| JP | A-2008-163818 | 7/2008 |
| JP | A-2009-500550 | 1/2009 |
| JP | B2-4211208 | 1/2009 |
| WO | WO 2007/101770 A1 | 9/2007 |

OTHER PUBLICATIONS

Mar. 23, 2011 Chinese Office Action issued in Chinese Patent Application No. 200910211695.7 (with Translation).

Notification of Reasons for Rejection dated Aug. 26, 2010 in corresponding Japanese Application No. 2009-045433 (with translation).

* cited by examiner

ENGINE START SYSTEM FOR USE IN IDLE STOP SYSTEM FOR AUTOMOTIVE VEHICLE

CROSS REFERENCE TO RELATED DOCUMENT

The present application claims the benefits of Japanese Patent Application Nos. 2008-229885 filed on Sep. 8, 2008 and 2009-45433 filed on Feb. 27, 2009, disclosures of which are incorporated herein by reference.

BACKGROUND OF THE INVENTION

1. Technical Field of the Invention

The present invention relates generally to an engine start system for use in an idle stop system for automotive vehicles (also called an automatic engine stop/restart system) which works to stop an automotive engine automatically, for example, when the vehicle has stopped at an intersection or due to a traffic jam and then restart the engine when the vehicle driver performs a given starting operation (e.g., upon release of the driver's foot from the brake pedal).

2. Background Art

There are known automotive idle stop systems designed to stop the engine automatically when an output of the engine is required not to be produced and restart the engine automatically when the engine is requested to produce the output. In such systems, when a vehicle driver performs a given restarting operation after the engine is requested to stop, an engine restart request is produced to crank the engine. For example, Japanese Patent First Publication No. 2003-301765 discloses the above type of idle stop system.

Usually, starting of automotive engines is achieved by turning a ring gear joined to a crankshaft of the engine using an electronic starter to crank the engine. A pinion gear is brought into meshing engagement with the ring gear for rotating the ring gear. The pinion gear is driven by a starter motor. Before the engine is started, the pinion is usually not in mesh with the ring gear. When it is requested to start the engine, the pinion gear is pushed toward a given position and then engages the ring gear. The position at which the pinion gear is engagable or engages the ring gear will be referred to below as an engaged position. The position at which the pinion gear is not in engagement from the ring gear will be referred to below as a disengaged position.

Such engine restart control encounters a problem especially when the engine restart request is made after the engine stop request is made, but before the engine stops completely. Specifically, in such an event, restarting of the engine after it stops completely may lead to concern about the discomfort of the vehicle operator. Usually, a maximum length of time required by the engine to stop completely after being requested to be stopped is about one (1) second. However, when the accelerator pedal is depressed by the vehicle operator immediately after the engine is requested to stop, the engine may fail to restart quickly, thus causing the vehicle operator to feel uncomfortable.

It is, therefore, essential to restart the engine quickly without waiting until after the engine stops completely. Such engine restart control using the above conventional starter requires a determination of how to schedule the time when the pinion gear is to be moved from the disengaged position to the engaged position and the time when the electric power is to be supplied to the starter motor to rotate the pinion gear.

In recent years, there has been proposed to supply the electric power to the starter motor even when the engine is not requested to be restarted. For example, International Publication No. 2007/101770 A1 teaches an engine start system designed to supply the electric power to the starter motor without waiting for the engine restart request to rotate the pinion gear at the disengaged position every time the engine is requested to be stopped, monitor speeds of the pinion gear and the ring gear, and bring them into engagement with each other. In other words, such a system works to perform two tasks: one is to supply the electric power to the starter motor, and the other is to control the pushing of the pinion gear even if the engine restart request is not made.

The above system, however, poses the problem that the engagement of the pinion gear with the ring gear achieved each time the engine restart request is made generates mechanical noise with which vehicle occupants usually feel uncomfortable.

In order to alleviate the above gear engagement-caused noise, Published Japanese translation of International Patent Application No. 2008-510099 teaches controlling the flow of current through a solenoid actuator to move the pinion gear to the engaged position. This, however, requires a current control circuit such as a chopper circuit, thus resulting in a complex structure of the system.

The system, as taught in either of the above publications, is designed to supply the electric power to the starter motor when the engine restart request is not made, thus resulting in an increase in consumption of power in the battery. This leads to a great concern about an increase in consumption of fuel in the automotive vehicle or a lack of electric power to be supplied to electric accessories when the engine is restarted.

In order to eliminate the above problem, Japanese Patent First Publication No. 2005-330813 teaches an automatic engine stop/restart system designed to supply the electric power to the starter motor only when the engine restart request has been made, monitor speeds of the pinion gear and the ring gear, and move the pinion gear to the engaged position. The system, however, has already supplied the electric power to the starter motor upon engagement of the pinion gear with the ring gear whenever the engine restart request is made. There is, therefore, still a problem of an increase in consumption of fuel in the vehicle. Additionally, it is also necessary to monitor the speeds of the pinion gear and the ring gear, thus resulting in a complex structure of the system.

When the engine is requested to be restarted immediately after the vehicle stops, it is, as described above, essential to restart the engine quickly without waiting until after the engine stops completely, in other words, while the engine is still decelerating. The automatic engine stop/start system, as taught in the above Japanese Patent First Publication No. 2005-330813, starts to supply the electric power to a shunt coil to rotate the pinion gear when the engine restart request is made while the speed of the engine is still decreasing, and brings the pinion gear into engagement with the ring gear at the time when the rotation of the pinion gear has been found to be synchronous with that of the ring gear.

Japanese Patent First Publication No. 2007-107527 teaches a starter control system designed to bring the pinion gear into engagement with the ring gear when the speed of the engine lies between preselected maximum and minimum values, and the engine is rotating in the same direction as a forward direction of the crankshaft of the engine.

The automatic engine stop/start system in the above Japanese Patent First Publication No. 2005-330813, however, needs to synchronize the speed of the pinion gear with that of the ring gear and thus may fail in such synchronization in a range where the speed of the engine is much low because the speed of the engine drops before the starter starts to rotate. Additionally, when the engine has undergone a fuel cut in response to an idle stop request, the speed of the engine usually drops rapidly and overshoots a zero point, so that the rotation of the engine is reversed. The engine then decreases in speed down to zero while continuing to oscillate in rotation in the normal direction and the reverse direction cyclically for a while. In a range where the engine continues to oscillate in rotation in the normal direction and the reverse direction cyclically (which will also be referred to below as an engine speed oscillating range), it is difficult to synchronize the speed of the pinion gear with that of the ring gear. An excessive mechanical impact will also be produced upon engagement of the pinion gear with the ring gear, which may cause the damage to the ring gear.

The starter control system in the above Japanese Patent First Publication No. 2007-107527 needs to measure the direction in which the engine is rotating in order to bring the pinion gear into engagement with the ring gear only when the direction of rotation of the engine agrees with the forward direction of the crankshaft. In other words, this system inhibits the pinion gear from being brought into engagement with the ring gear in a range where the engine is rotating in the reverse direction, thus resulting in a difficulty in achieving the engagement of the pinion gear with the ring gear in the engine speed oscillating range.

SUMMARY OF THE INVENTION

It is therefore an object of the invention to provide a simplified structure of an engine start system which may be employed in automotive vehicles and is designed to minimize the consumption of fuel arising from supply of electric power to a starter for an engine such as an automotive internal combustion engine.

According to one aspect of the invention, there is provided an engine system which may be employed in engine-powered automotive vehicles. The engine start system is designed to restart an engine such as an internal combustion engine when an engine restart request is made before complete stop of the engine following an engine stop request. The engine start system includes a pinion gear, a solenoid, a starter motor, and a controller. The starting of the engine is achieved by rotating the pinion gear through the starter motor to rotate a ring gear coupled to a crankshaft of the engine. The pinion gear is disposed to be movable between an engaged position where the pinion gear engages the ring gear and a disengaged position where the pinion gear is disengaged from the ring gear. The solenoid works as an actuator to move the pinion gear from the disengaged position to the engaged position. The controller controls energization of the solenoid and the starter motor.

In response to the engine restart request, the controller executes a decision task, a first power supply task, a condition decision task, and a second power supply task. The decision task is to decide whether a speed of the engine is lower than or equal to a preselected gear engagable speed at which the pinion gear is engagable with the ring gear or not. Usually, when the speed of the engine drops below a certain speed, the pinion gear will be permitted to engage with the ring gear without need for rotating the pinion gear. This speed is referred to herein as the gear engagable speed.

The first power supply task is to supply the electric power to the solenoid when the decision task has decided that the speed of the engine is lower than or equal to the preselected gear engagable speed, thereby moving the pinion gear from the disengaged position to the engaged position.

The condition decision task is to decide whether a given condition is met or not. For example, it is determined whether a predetermined period of time has passed or not.

When the given condition has been decided to be met, the second power supply task supplies the electric power to the starter motor, thereby rotate the pinion gear to crank the engine.

Some of conventional engine start systems are designed to rotate the pinion gear placed in the disengaged position and then bring it into engagement with the ring gear in order to start the engine quickly. In other words, the systems supply the electric power to the starter motor in order to achieve meshing engagement of the pinion gear with the ring gear.

In contrast, the engine start system of the invention is designed not to supply the electric power to the starter motor in order to achieve the engagement of the pinion gear with the ring gear. Specifically, the system waits until after the speed of the engine has reached the gear engagable speed and then brings the pinion gear into engagement with the ring gear. This is because an effective speed that is the speed of the engine at which the engine is to be cranked desirably or effectively, that is, which ensures the stability in starting the engine is usually lower than the gear engagable speed. In other words, the high stability in cranking the engine through the starter motor is assured after the speed of the engine drops below the effective speed. The quick starting of the engine is, therefore, achieved by bringing the pinion gear into engagement with the ring gear just before the effective speed is reached.

As apparent from the above discussion, the system of the invention does not rotate the pinion gear prior to the engagement of the pinion gear with the ring gear. In other words; after the pinion gear engages the ring gear, the second power supply task supplies the electric power to the starter motor to crank the engine, thus minimizing the consumption of fuel in the vehicle arising from the supply of electric power to the starter motor. The system also does not rotate the pinion gear in order to achieve the engagement of the pinion gear with the ring gear, thus eliminating the need for monitoring the rotational speed of the pinion gear, which results in a simplified structure of the system.

The system achieves the engagement of the pinion gear with the ring gear only when the engine restart request has been made, so that metal noise arising from such engagement will be included in the cranking noise, thus alleviating the discomfort of the vehicle operator.

When a standby time that is the time required by the pinion gear to engage the ring gear has elapsed, the condition decision task may decide that the given condition is met. This ensures the stability in executing the second power supply task after the pinion gear engages the ring gear completely.

The engine may be reversed temporarily depending upon a balance between reactive compression of air in cylinders of the engine and the friction between pistons and the cylinders just before complete stop of the engine. In such an event, when the engine restart request is made, and the pinion gear engages the ring gear, torque will be exerted on the one-way clutch in the reverse direction. This causes the torsional stress to act on an output shaft of the starter motor. At that moment, actuation of the starter motor will cause the torque to be added to the output shaft of the starter motor against the torsional stress, so that a large amount of stress acts on the output shaft of the starter motor.

In order to avoid the above problem, when the engine has been found as being rotating in the reverse direction at a given time, the condition decision task may decide whether a longer standby time that is a time longer than the standby time has elapsed or not. When it is decided that the longer standby time has elapsed, the condition decision task decides the given condition is met. The longer standby time may be slightly longer than the standby time. This is because the above torsional stress usually occurs only instantaneously, so that a maximum magnitude of the torsional stress on the output shaft of the starter motor may be minimized by delaying the time when the electric power is to be supplied to the starter motor, that is, the second power supply task is to be executed slightly from the standby time to shift the time when the torshional stress occurs. The above given time may be when the first power supply tasks is to be executed. The fact that the engine is rotating in the reverse direction may, therefore, be determined to have been found when the first power supply task is executed.

When the engine restart request is made relatively earlier, the speed of the engine does not yet drop below the effective speed upon the engagement of the pinion gear with the ring gear. The high stability in cranking the engine is, as described above, ensured at the time when the speed of the engine has dropped below the effective speed.

Therefore, the condition decision task may decide whether the standby time has elapsed or not, and the speed of the engine is lower than or equal to the effective speed or not. When the standby time is decided as having elapsed, and the speed of the engine is decided to be lower than or equal to the effective speed, the condition decision task decides that the given condition is met. This causes the electric power to be supplied to the starter motor when the speed of the engine has dropped below the effective speed, thus further minimizing the consumption of fuel in the vehicle arising from the supply of power to the starter motor.

The movement of the pinion gear from the disengaged position to the engaged position is achieved, as already described, by supplying the electric power to energize the solenoid in the first power supply task. Any disadvantages caused by heat dissipation from the solenoid being energized is preferably alleviated. If the solenoid is designed to have a measure to protect against the heat, it will result in an increase in size of the solenoid.

In order to avoid the above problem the solenoid may be made up of a first solenoid and a second solenoid to which the first power supply task controls supply of the electric power. The second solenoid is connected at one of ends thereof to a high-potential side of the starter motor. The second solenoid are placed to have the ends at the same potential by execution of the second power supply task. When the second power supply task starts to be executed, the electric power is supplied only to the first solenoid, thereby reducing the amount of heat generated by the solenoid and eliminating the need for installation of the heat protection means in the solenoid.

According to the second aspect of the invention, there is provided an engine start system designed to restart an engine when an engine restart request is made before complete stop of the engine following an engine stop request. The engine start system includes a pinion gear, a pinion actuator, a starter motor, and a controller.

The starting of the engine is achieved by rotating the pinion gear through the starter motor to rotate a ring gear coupled to a crankshaft of the engine. The pinion gear is disposed to be movable between an engaged position where the pinion gear engages the ring gear and a disengaged position where the pinion gear is disengaged from the ring gear. The pinion actuator works to move the pinion gear from the disengaged position to the engaged position. The controller controls energization of the starter motor.

In response to the engine restart request, the controller executes a decision task, a pinion moving task, a condition decision task, and a power supply task.

The decision task is to decide whether the speed of the engine is lower than or equal to a preselected speed or not. Usually, when the speed of the engine drops below a certain speed, the pinion gear will be permitted to engage with the ring gear without need for rotation of the pinion gear. This speed is referred to herein as the preselected speed.

The pinion moving task is to move the pinion to the engaged position when the decision tasks determines that the speed of the engine is lower than or equal to the preselected speed. The pinion moving task may be achieved by supplying the electric power to the pinion actuator made by, for example, a solenoid.

The condition decision task is to decide whether a given condition is met or not after execution of the pinion moving task.

When the condition decision task decides that the given condition is met, the power supply task supplies the electric power to the starter motor to rotate the pinion gear, thereby cranking the engine.

In order to start the engine quickly, some of conventional engine start systems are designed to rotate the pinion gear placed in the disengaged position and then bring it into engagement with the ring gear. In other words, the systems supply the electric power to the starter motor in order to achieve meshing engagement of the pinion gear with the ring gear.

In contrast, the engine start system of the invention is designed not to supply the electric power to the starter motor in order to achieve the engagement of the pinion gear with the ring gear. Specifically, the system waits until after the speed of the engine has reached the preselected speed and then brings the pinion gear into engagement with the ring gear. This is because the effective speed that is the speed of the engine which ensures the stability in starting the engine is usually lower than the preselected speed. In other words, the high stability in cranking the engine through the starter motor is assured after the speed of the engine drops below the effective speed. The quick starting of the engine is, therefore, achieved by bringing the pinion gear into engagement with the ring gear just before the effective speed is reached.

As apparent from the above discussion, the system of the invention does not rotate the pinion gear prior to the engagement of the pinion gear with the ring gear. In other words, after the pinion gear engages the ring gear, the power supply task supplies the electric power to the starter motor to crank the engine, thus minimizing the consumption of fuel in the vehicle arising from the supply of electric power to the starter motor. The system also does not rotate the pinion gear in order to achieve the engagement of the pinion gear with the ring gear, thus eliminating the need for monitoring the rotational speed of the pinion gear, which results in a simplified structure of the system.

The system achieves the engagement of the pinion gear with the ring gear only when the engine restart request has been made, so that metal noise arising from such engagement will be included in the cranking noise, thus alleviating the discomfort of the vehicle operator.

When a standby time that is the time required by the pinion gear to engage the ring gear has elapsed, the condition decision task may decide that the given condition is met. This ensures the stability in executing the second power supply task after the pinion gear engages the ring gear completely.

The engine may be reversed temporarily depending upon a balance between reactive compression of air in cylinders of the engine and the friction between pistons and the cylinders just before complete stop of the engine. In such an event, when the engine restart request is made, and the pinion gear engages the ring gear, torque will be exerted on the one-way clutch in the reverse direction. This causes the torsional stress to act on an output shaft of the starter motor. At that moment, actuation of the starter motor will cause the torque to be added to the output shaft of the starter motor against the torsional stress, so that a large amount of stress acts on the output shaft of the starter motor.

In order to avoid the above problem, when the engine has been found as being rotating in the reverse direction at a given time, the condition decision task may decide whether a longer standby time that is a time longer than the standby time has elapsed or not. When it is decided that the longer standby time has elapsed, the condition decision task decides the given condition is met. The longer standby time may be slightly longer than the standby time. This is because the above torsional stress usually occurs only instantaneously, so that a maximum magnitude of the torsional stress on the output shaft of the starter motor may be minimized by delaying the time when the electric power is to be supplied to the starter motor, that is, the power supply task is to be executed slightly from the standby time to shift the time when the torsional stress occurs. The above given time may be when the pinion moving tasks is to be executed. The fact that the engine is rotating in the reverse direction may, therefore, be determined to have been found when the pinion moving task is executed.

When the speed of the engine drops below the preselected speed, it permits, as described above, the pinion gear to be brought into engagement with the ring gear without rotating the pinion gear. The preselected speed may be set lower than or equal to a given idle speed of the engine and greater than or equal to a minimum value of the speed of the engine which pulsates when the engine is being cranked by the starter motor. For example, as illustrated in FIG. 3, the preselected speed (i.e., the set speed in FIG. 3) may be selected to be lower than or equal to the idle speed and greater than or equal to the minimum value P of the engine speed.

The engine starter system may further include an impact absorber working to absorb torque exerted on the starter motor when supplied with the electric power, thereby further improving the reliability in operation of the system.

When the engine restart request is made relatively earlier, the speed of the engine does not yet drop below the effective speed upon the engagement of the pinion gear with the ring gear. The high stability in cranking the engine is, as described above, ensured at the time when the speed of the engine has dropped below the effective speed.

Therefore, after the standby time elapses, the condition decision task may decide whether the standby time has elapsed or not, and the speed of the engine is lower than or equal to the effective speed or not. When the standby time is decided as having elapsed, and the speed of the engine is decided to be lower than or equal to the effective speed, the condition decision task decides that the given condition is met. This causes the electric power to be supplied to the starter motor when the speed of the engine has dropped below the effective speed, thus further minimizing the consumption of fuel in the vehicle arising from the supply of power to the starter motor.

The movement of the pinion gear from the disengaged position to the engaged position is achieved, as already described, by supplying the electric power to energize the pinion actuator made by a solenoid in the pinion moving task. Any disadvantages caused by heat dissipation from the solenoid being energized is preferably alleviated. If the solenoid is designed to have a measure to protect against the heat, it will result in an increase in size of the solenoid.

In order to avoid the above problem the solenoid may be made up of a first solenoid and a second solenoid to which the first power supply task controls supply of the electric power. The second solenoid is connected at one of ends thereof to a high-potential side of the starter motor. The second solenoid are placed to have the ends at the same potential by execution of the second power supply task. When the second power supply task starts to be executed, the electric power is supplied only to the first solenoid, thereby reducing the amount of heat generated by the solenoid and eliminating the need for installation of the heat protection means in the solenoid.

The engine start system may be installed in a vehicle equipped with an idle stop system working to stop and restart the engine automatically.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
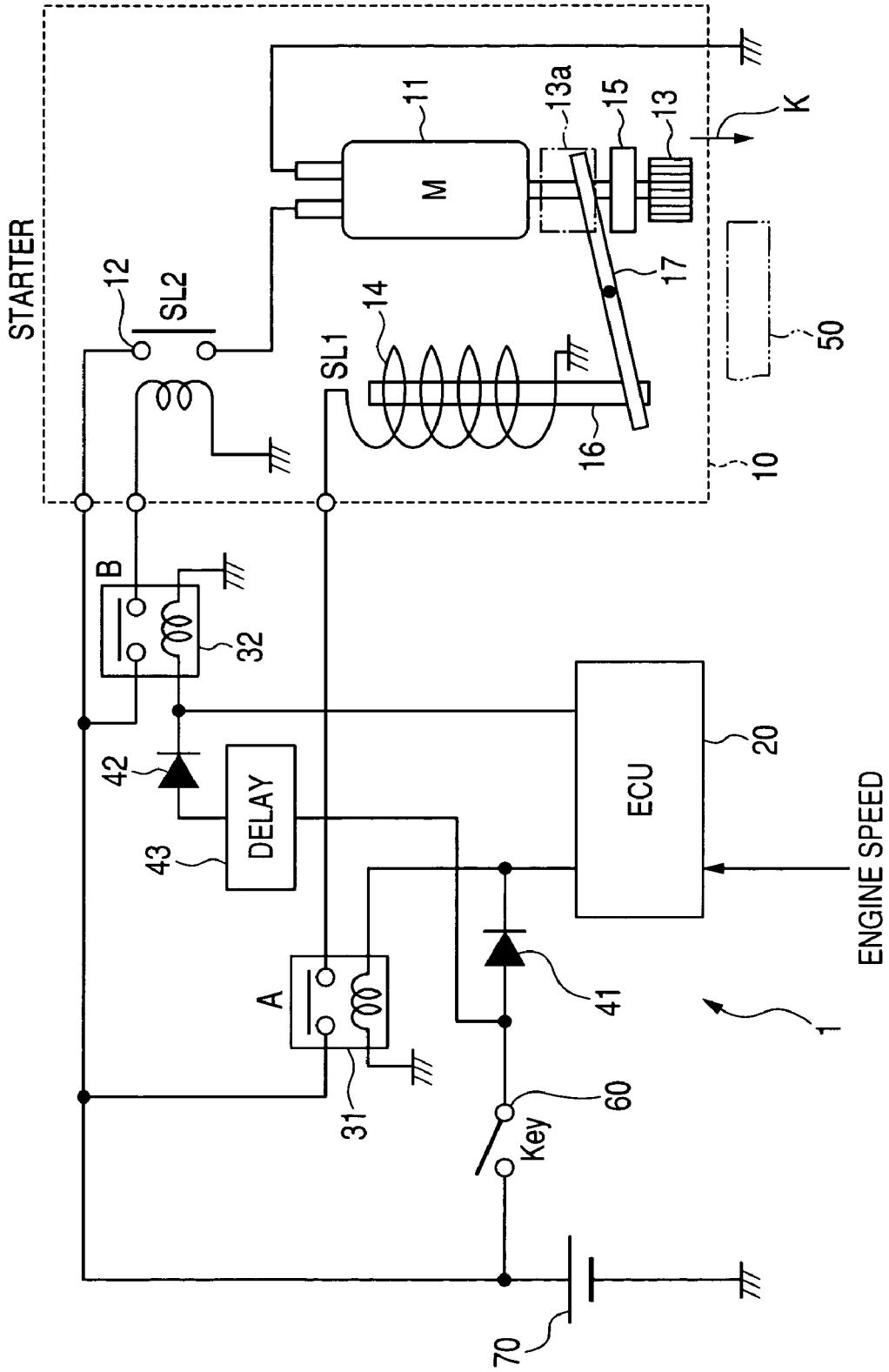
FIG. 1 is a circuit diagram which shows an engine start system according to the first embodiment of the invention.

Referring to the drawings, wherein like reference numbers refer to like parts in several views, particularly to FIG. 1, there is shown an engine start system 1 according to the first embodiment of the invention which is used with an idle stop system to stop an automotive engine automatically when a vehicle has stopped, for example, at an intersection.

The engine start system 1 includes a starter 10, an electronic control unit (ECU) 20, two drive relays 31 and 32, and two diodes 41 and 42.

The starter 10 is equipped with a starter motor 11, a relay switch 12 to supply electric power to the starter motor 11, a pinion gear 13, and a solenoid 14 working as an actuator to move the pinion gear 13 between an engaged position and a disengaged position, which will be described later in detail.

The starter motor 11 is connected at one of ends thereof to a storage battery 70 through the relay switch 12 and at the other end to ground. When the relay switch 12 is turned on, the starter motor 11 is actuated. The starter motor 11 has the pinion gear 13 joined to an output shaft or drive shaft thereof. When the starter motor 11 is actuated, the pinion gear 13 will be rotated. A one-way clutch 15 is joined to the drive shaft of the starter motor 11 to transmit torque, as outputted by the starter motor 11, to the pinion gear 13. The one-way clutch 15 permits the transmission of torque from the starter motor 11 to the pinion gear 13 when the starter motor 11 is rotating in a normal direction, but blocks it from the pinion gear 13 to the starter motor 11. A speed reducer is usually disposed between the one-way clutch 15 and the starter motor 11, but omitted in FIG. 1 for the brevity of illustration.

The pinion gear 13 is engagable with a ring gear 50 joined to a crankshaft of an automotive internal combustion engine (not shown). This structure is of typical in automobiles, and explanation thereof in detail will be omitted here. When the pinion gear 13 is placed in engagement with the ring gear 50, that is, it is in the engaged position, and the starter motor 11 is actuated to rotate the pinion gear 13, the engine is cranked. The pinion gear 13 is, as described above, moved by the solenoid 14 between the engaged position and the disengaged position. In the disengaged position, the pinion gear 13 is disengaged from the ring gear 50.

When supplied with electric power, the solenoid 14 is energized to move the pinion gear 13 in an axial direction thereof. Specifically, when activated, the solenoid 14 works to attract a plunger 16 to push the pinion gear 13 through a shift lever 17, so that the pinion gear 13 is moved in a direction K, as illustrated in FIG. 1, from the disengaged position to the engaged position.

An impact absorber 13a is disposed on the drive shaft of the starter motor 11 to absorb torque or mechanical impact, as transmitted from the ring gear 50, when the pinion gear 13 is in engagement with the ring gear 50. This improves the mechanical reliability of the engine start system 1.

The solenoid 14 and the relay switch 12 are denoted by "SL1" and "SL2" in FIG. 1 for facilitating the understanding of discussion below.

The ECU 20 is implemented by a computer equipped with a ROM, a RAM, an I/O, and a bus line connecting them and works as a controller to supply electric power to control operations of the drive relays 31 and 32 and place them in an ON position. The ECU 20 controls operations of the drive relays 31 and 32 to control the operation of the starter 10. The drive relays 31 and 32 will also be referred to below as an A-drive relay and a B-drive relay. The ECU 20 is responsive to a restart request outputted from the engine to actuate the starter 10. The restart request is inputted to the ECU 20 through an external signal line (not shown).

The A-drive relay signal 31 is interposed between the solenoid 14 and the battery 70. When the A-drive relay 31 is turned on by the ECU 20, it will cause the electric power to be supplied from the battery 70 to the solenoid 14 to move the pinion gear 13 from the disengaged position to the engaged position.

The B-drive relay 32 is connected to the control terminal of the relay switch 12 of the starter 10. When the B-drive relay 32 is turned on by the ECU 20, it will cause the relay switch 12 to be turned on to supply the electric power from the battery 70 to the starter motor 11, thereby rotating the pinion gear 13.

The control terminals of the drive relays 31 and 32 are joined to the battery 70 through a key switch 60 and the diodes 41 and 42, respectively. The key switch 60 is to be turned on when the ignition key is turned to a start position. Therefore, when the ignition key is turned, the A- and B-drive relays 31 and 32 are both turned on to push the pinion gear 13 from the disengaged position to the engaged position and rotate it. A delay circuit 43 is disposed between the battery 70 and the B-drive relay 32 in order to launch the supply of power to the solenoid 14 prior to that to the starter motor 11 when the key switch 60 is turned on by the ignition switch.

The operation of the engine start system 1 will be described below with reference to a flowchart of FIG. 2 which represents an engine start control program to be executed by the ECU 20 upon input of the restart request to restart the engine.

First, in step 100, it is determined whether the engine speed is lower than or equal to a set speed or not.

Figure 3:
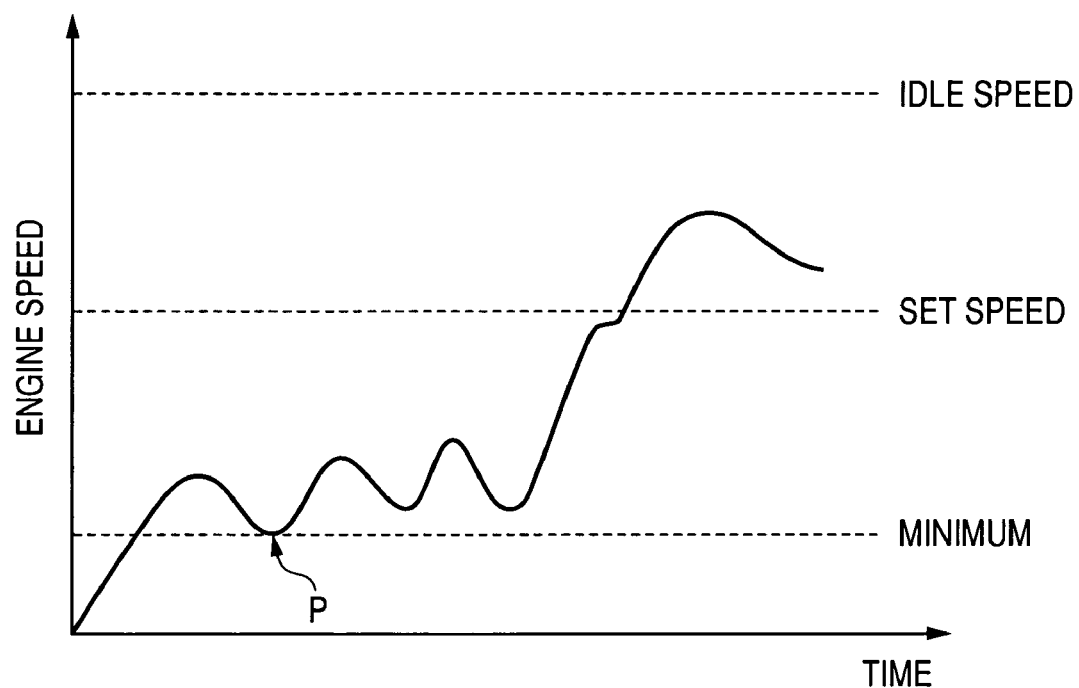
FIG. 3 is a graph which represents a range in which a set value of speed of an engine which is used in the engine start program of FIG. 2.

The set speed, as used in this embodiment, will be discussed below. When a difference in rotational speed between the pinion gear 13 and the ring gear 50 is relatively great, it is usually difficult to establish meshing engagement between the pinion gear 13 and the ring gear 50. The speed of the engine below which the engagement of the pinion gear 13 with the ring gear 50 is achieved without need to rotate the pinion gear 13 is selected in this embodiment as the set speed which will also be referred to herein as a gear engagable speed. Specifically, when the engine speed is lower than or equal to the set speed, it enables the pinion gear 13 to engage the ring gear 50 without needed to be rotated. The set speed is, as demonstrated in FIG. 3, lower than or equal to a typical idle speed of the engine (i.e., a preselected idle speed) and greater than or equal to a minimum value P of the engine speed which pulsates when the engine is being cranked by the starter motor 11.

If a YES answer is obtained in step 100 meaning that the engine speed is lower than or equal to the set speed, the routine proceeds to step 110. Alternatively, if a NO answer is obtained, the routine repeats step 100.

In step 110, the A-drive relay 31 is energized to supply the power to the solenoid 14 to push the pinion gear 13 toward the engaged position.

The routine proceeds to step 120 wherein it is determined whether the engine speed is lower than zero (0) or not. If a YES answer is obtained meaning that the engine speed<0, then the routine proceeds to step 130 wherein a longer standby time is determined. Alternatively, if a NO answer is obtained meaning that the engine speed≧0, then the routine proceeds to step 140 wherein a standby time is determined. The standby time is the length of time required by step 110 to move the pinion gear 13 to the engaged position until it engages the ring gear 50. The longer standby time is set slightly longer than the standby time.

After step 130 or 140, the routine proceeds to step 150 wherein it is determined whether the time, as set in step 130 or 140, has elapsed or not. If a YES answer is obtained, then the routine proceeds to step 160 wherein the B-drive relay 32 is energized. Alternatively, if a NO answer is obtained, then the routine repeats step 150.

The above engine start control, as performed by the ECU 20, will also be described in more detail with reference to timing charts in FIGS. 4(a) to 4(d).

Figure 4A:
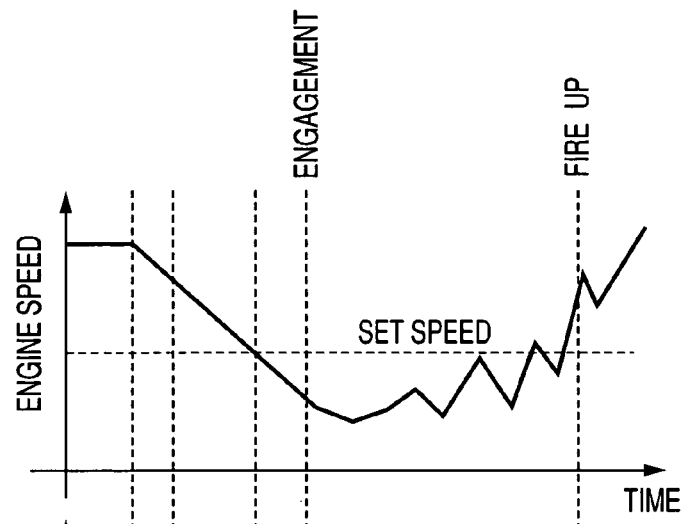
FIG. 4(a) is a chart which represents a variation in speed of an engine in the case where a time interval between when an engine stop request is made and when an engine restart request is made is relatively short.
Figure 4B:
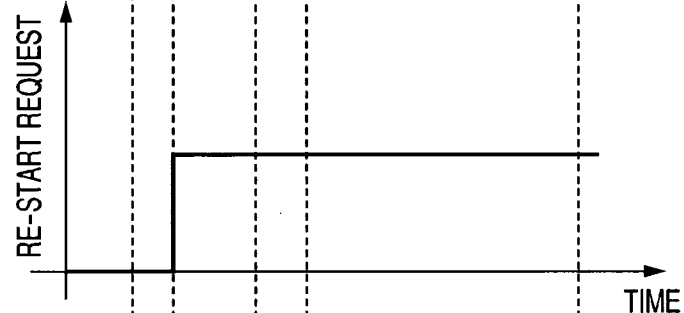
FIG. 4(b) is a chart which represents the time when an engine restart request is made in the engine start system of FIG. 1 in the case where a time interval between when an engine stop request is made and when an engine restart request is made is relatively short.

When an engine stop request is produced to cut the supply of fuel to the engine at time T1, it will cause, as demonstrated in FIG. 4(a), the engine speed to drop. In this example, an engine restart request is produced at time T2 in FIG. 4(b).

Figure 2:
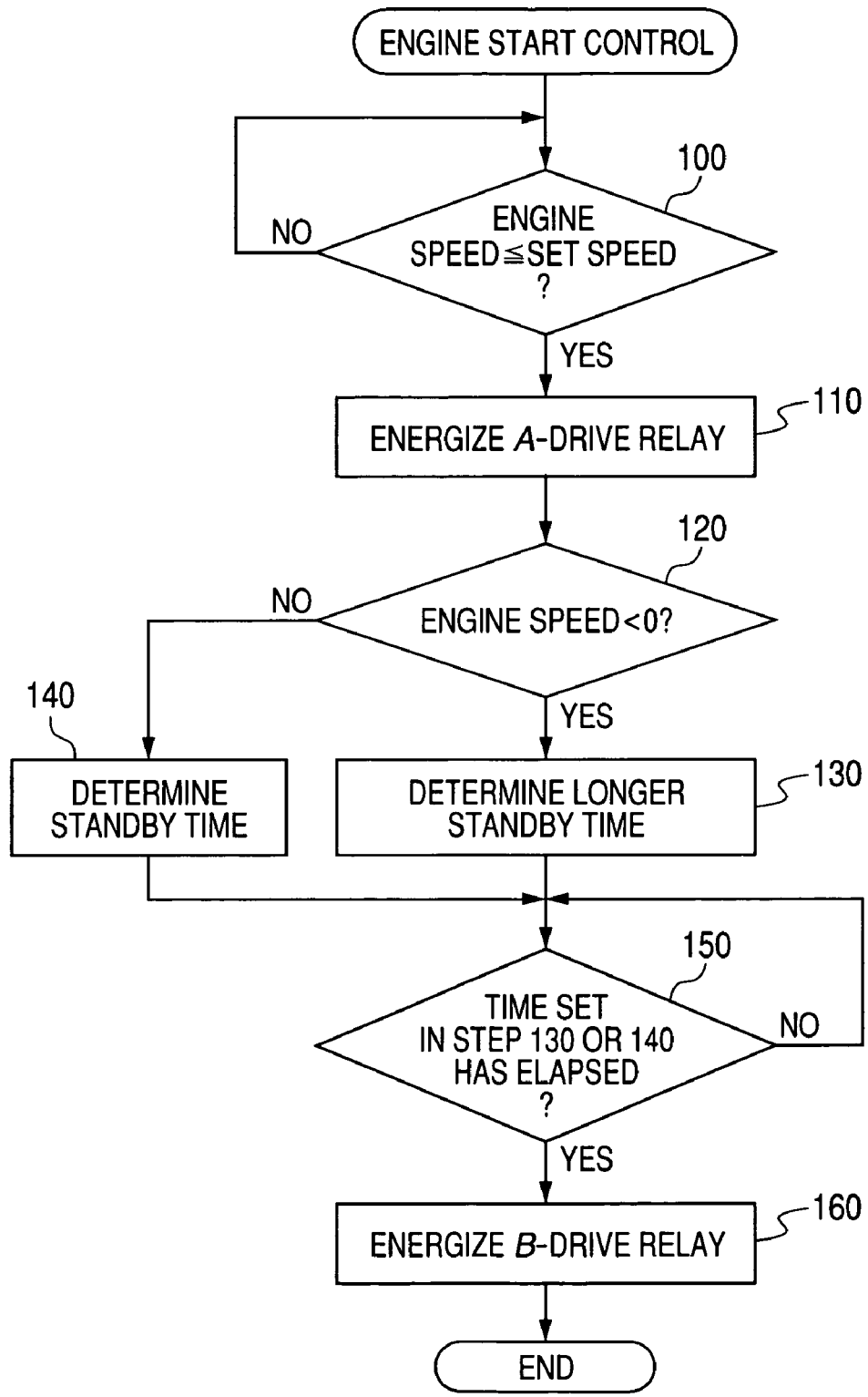
FIG. 2 is a flowchart of an engine start control program to be executed by the engine start system of FIG. 1.

The ECU 20 holds the following operation until the engine speed decreases to the set speed (see step 100 in FIG. 2).

Figure 4C:
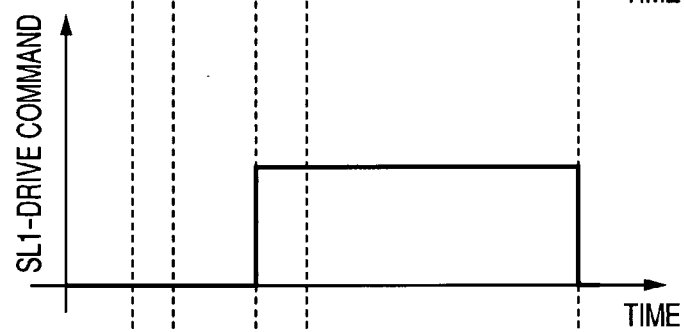
FIG. 4(c) is a chart which represents the time when an SL1-drive command signal is to be outputted in the engine start system of FIG. 1 in the case where a time interval between when an engine stop request is made and when an engine restart request is made is relatively short.
Figure 4D:
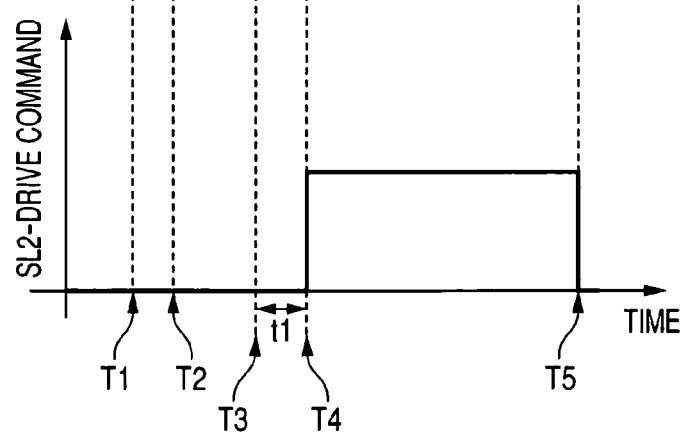
FIG. 4(d) is a chart which represents the time when an SL2-drive command signal is to be outputted in the engine start system of Fig. in the case where a time interval between when an engine stop request is made and when an engine restart request is made is relatively short.

When the engine speed reaches the set speed at time T3, the ECU 20 outputs, as demonstrated in FIG. 4(c), an SL1-drive command signal (see step 110 in FIG. 2). Specifically, the ECU 20 turns on the A-drive relay 31 to supply the power to the solenoid 14, thereby moving the pinion gear 13 to the engaged position.

The ECU 20 determines whether the standby time required to achieve the engagement of the pinion gear 13 with the ring gear 50 has elapsed or not (see step 150 in FIG. 2). At time T4 when the pinion gear 13 has meshed with the ring gear 50, the ECU 20 outputs, as demonstrated in FIG. 4(d), an SL-2 drive command signal (see step 160 in FIG. 2). Specifically, the ECU 20 turns on the B-drive relay 32 to turn on the relay switch 12, thereby supplying the power to the starter motor 11. The starter motor 11 then starts to crank the engine. At time T5, the engine starts.

FIGS. 5(a) to 5(d) demonstrate operations of the engine start system 1 in the case where a time interval between the engine stop request and the engine restart request is relatively long.

Figure 5A:
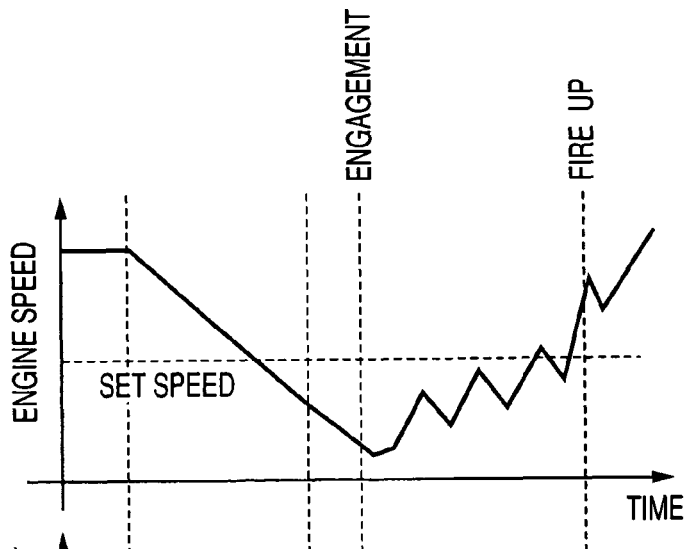
FIG. 5(a) is a chart which represents a variation in speed of an engine in the case where a time interval between when an engine stop request is made and when an engine restart request is made is relatively short.
Figure 5B:
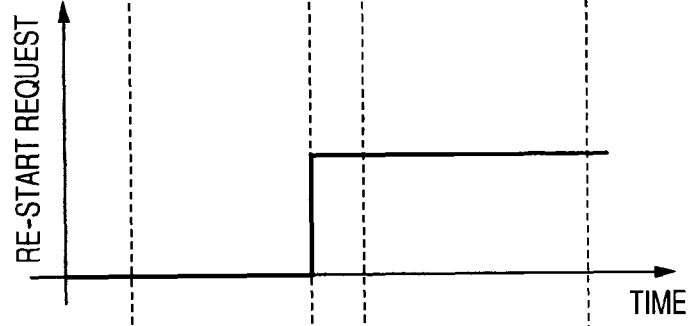
FIG. 5(b) is a chart which represents the time when an engine restart request is made in the engine start system of FIG. 1 in the case where a time interval between when an engine stop request is made and when an engine restart request is made is relatively long.
Figure 5C:
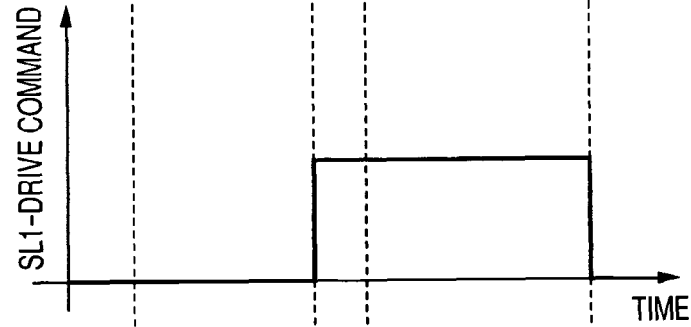
FIG. 5(c) is a chart which represents the time when an SL1-drive command signal is to be outputted in the engine start system of FIG. 1 in the case where a time interval between when an engine stop request is made and when an engine restart request is made is relatively long.
Figure 5D:
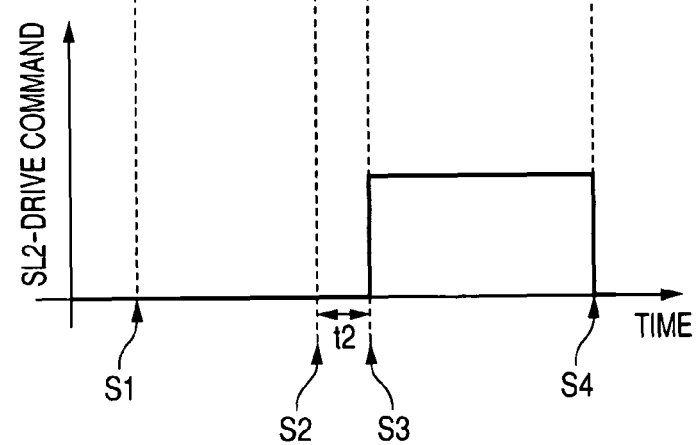
FIG. 5(d) is a chart which represents the time when an SL2-drive command signal is to be outputted in the engine start system of FIG. 1 in the case where a time interval between when an engine stop request is made and when an engine restart request is made is relatively long.

When the engine stop request is produced to cut the supply of fuel to the engine at time S1, it will cause, as demonstrated in FIG. 5(a), the engine speed to drop. In this example, an engine restart request is produced at time S2 in FIG. 5(b).

At time S2, the engine speed is lower than the set speed. The ECU 20 immediately outputs, as demonstrated in FIG. 5(c), the SL1-drive command signal (i.e., step 110 following a YES response in step 100 of FIG. 2), thereby moving the pinion gear 13 to the engaged position.

The ECU 20 determines whether the standby time required to achieve the engagement of the pinion gear 13 with the ring gear 50 has elapsed or not (see step 150 in FIG. 2). At time S3, the ECU 20 outputs, as demonstrated in FIG. 5(d), the SL-2 drive command signal (see step 160 in FIG. 2), thereby supplying the power to the starter motor 11. The starter motor 11 then starts to crank the engine. At time S4, the engine starts.

FIGS. 6(a) to 6(d) are timing charts which demonstrate operations of the engine start system 1 in the case where the engine rotates in a reverse direction temporarily just before stop of the engine and, at the same time, the engine restart request is outputted.

Figure 6A:
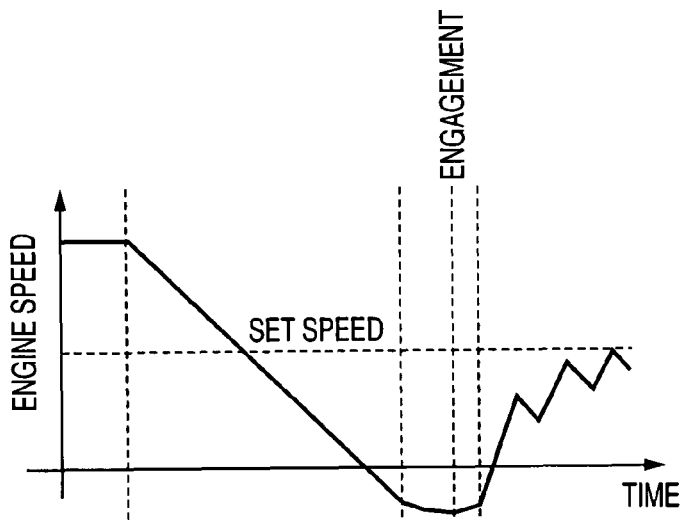
FIG. 6(a) is a chart which represents a variation in speed of an engine in the case where an engine restart request is made when the engine is reversing temporarily just before complete stop of the engine.
Figure 6B:
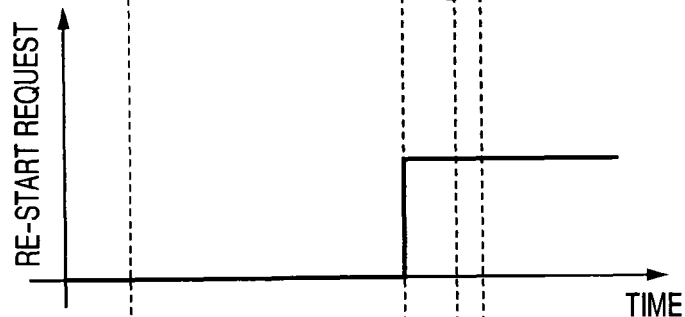
FIG. 6(b) is a chart which represents the time when an engine restart request is made in the engine start system of FIG. 1 in the case where an engine restart request is made when the engine is reversing temporarily just before complete stop of the engine.
Figure 6C:
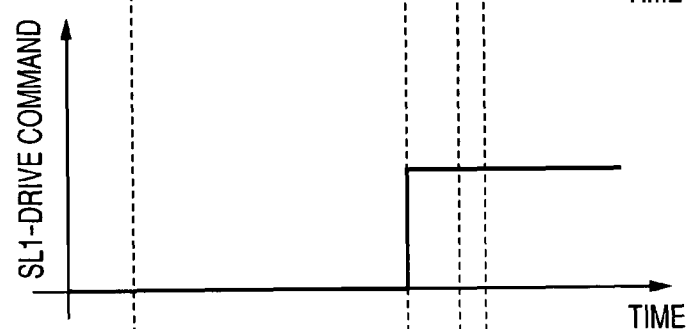
FIG. 6(c) is a chart which represents the time when an SL1-drive command signal is to be outputted in the engine start system of FIG. 1 in the case where an engine restart request is made when the engine is reversing temporarily just before complete stop of the engine.
Figure 6D:
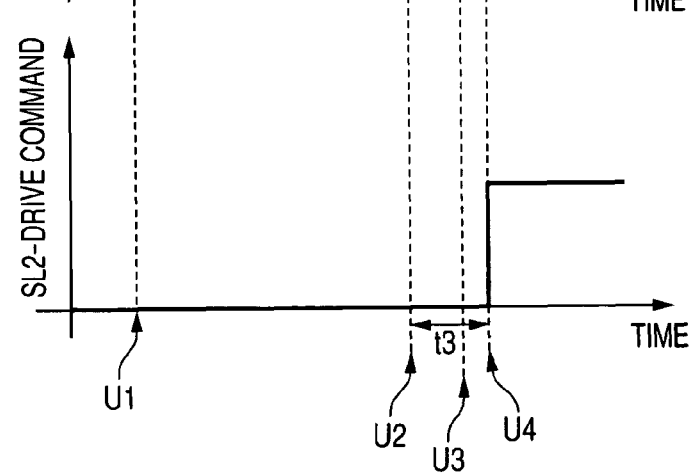
FIG. 6(d) is a chart which represents the time when an SL2-drive command signal is to be outputted in the engine start system of FIG. 1 in the case where an engine restart request is made when the engine is reversing temporarily just before complete stop of the engine.

When the engine stop request is produced to cut the supply of fuel to the engine at time U1, it will cause, as demonstrated in FIG. 6a), the engine speed to drop. In this example, the engine restart request is produced at time U2 in FIG. 6(b).

At time U2, the engine speed is lower than the set speed. The ECU 20 immediately outputs, as demonstrated in FIG. 6(c), the SL1-drive command signal (i.e., step 110 following a YES response in step 100 of FIG. 2), thereby moving the pinion gear 13 to the engaged position. The operations so far are identical with those in FIGS. 5(a) to 5(c).

Subsequently, the ECU 20 selects the longer standby time (see step 130 following a YES response in step 120) which is longer than the standby time (i.e., an interval between time U2 and time U3) required by the pinion gear 13 to engage the ring gear 50 and determine whether the longer standby time has elapsed or not (see step 150 in FIG. 2). At time U4 after a lapse of the longer standby time, the ECU 20 outputs, as demonstrated in FIG. 6(d), the SL-2 drive command signal (see step 160 in FIG. 2), thereby supplying the power to the starter motor 11. The starter motor 11 then starts to crank the engine.

The time intervals t1, t2, and t3, as illustrated in FIGS. 4(a) to 6(d), have a relation of $$t1=t2<t3.$$

The intervals t1 and t2 correspond to the standby time. The interval t3 corresponds to the longer standby time.

The engine start system 1 has the following advantages.

Upon reception of the engine restart request, the engine start system 1 (i.e., the ECU 20) waits without turning the pinion gear 13 until the engine speed drops below the set speed (see step 100 in FIG. 2) and then moves the pinion gear 13 to the engaged position (see step 110 and FIG. 4(c). When the engine speed is lower than or equal to the set speed, and the engine restart request is made, the ECU 20 immediately moves the pinion gear 13 to the engaged position (see FIGS. 5(c) and 6(c)). Upon engagement of the pinion gear 13 with the ring gear 50 (i.e., a YES response in step 150 of FIG. 2), the ECU 20 turns on the relay switch 12 to actuate the starter motor 11 (see step 160, and FIGS. 4(d) and 5(d)).

Specifically, when the engine restart request is made, the ECU 20 starts to rotate the starter motor 11 only when the pinion gear 13 is in the condition which ensures the mechanical engagement of the pinion gear 13 with the ring gear 50 without need for rotating the pinion gear 13. This minimizes the consumption of fuel in the vehicle caused by supplying the electric power to the starter motor 11 and also eliminates the need for monitoring the speed of the pinion gear 13 to establish the engagement with the ring gear 50, thus resulting in a simplified structure of the engine start system 1.

Moreover, the ECU 20 establishes the engagement of the pinion gear 13 with the ring gear 50 only when the engine restart request is made, thus resulting in addition of metallic noise arising from the engagement of the pinion gear 13 with the ring gear 50 to the cranking nose, which causes less discomfort for a driver and passengers in the vehicle.

The engine may be reversed temporarily immediately before being stopped. In such an event, cranking of the engine by the starter motor 11 just after the pinion gear 13 engages the ring gear 50 may cause the torsional or twisting stress arising from torque output from the starter motor 11 plus that arising from the engagement of the pinion gear 13 with the ring gear 50 to be exerted undesirably on the output shaft of the starter motor 11 and axes of the pinion gear 13 and the ring gear 50.

In order to avoid the above problem, the ECU 20 selects the longer standby time that is longer than the standby time required to achieve the engagement of the pinion gear 13 with the ring gear 50 when the engine speed has a negative value (see step 120 in FIG. 2) and, after an elapse of the longer standby time, turns on the relay switch 12 (step 160) to actuate the starter motor 11 (see FIG. 6(*d*)). The twisting stress arising from the engagement of the pinion gear 13 with the ring gear 50 is usually taken place for a moment just after the engagement is made. The time-sequential separation between the twisting stress arising from torque output from the starter motor 11 and that arising from the engagement of the pinion gear 13 with the ring gear 50 is, therefore, achieved by making the ECU 20 wait for the longer standby time when the engine is considered to be being reversed, thereby minimizing the metal fatigue of the starter motor 11, the pinion gear 13, and the ring gear 50.

Figure 7:
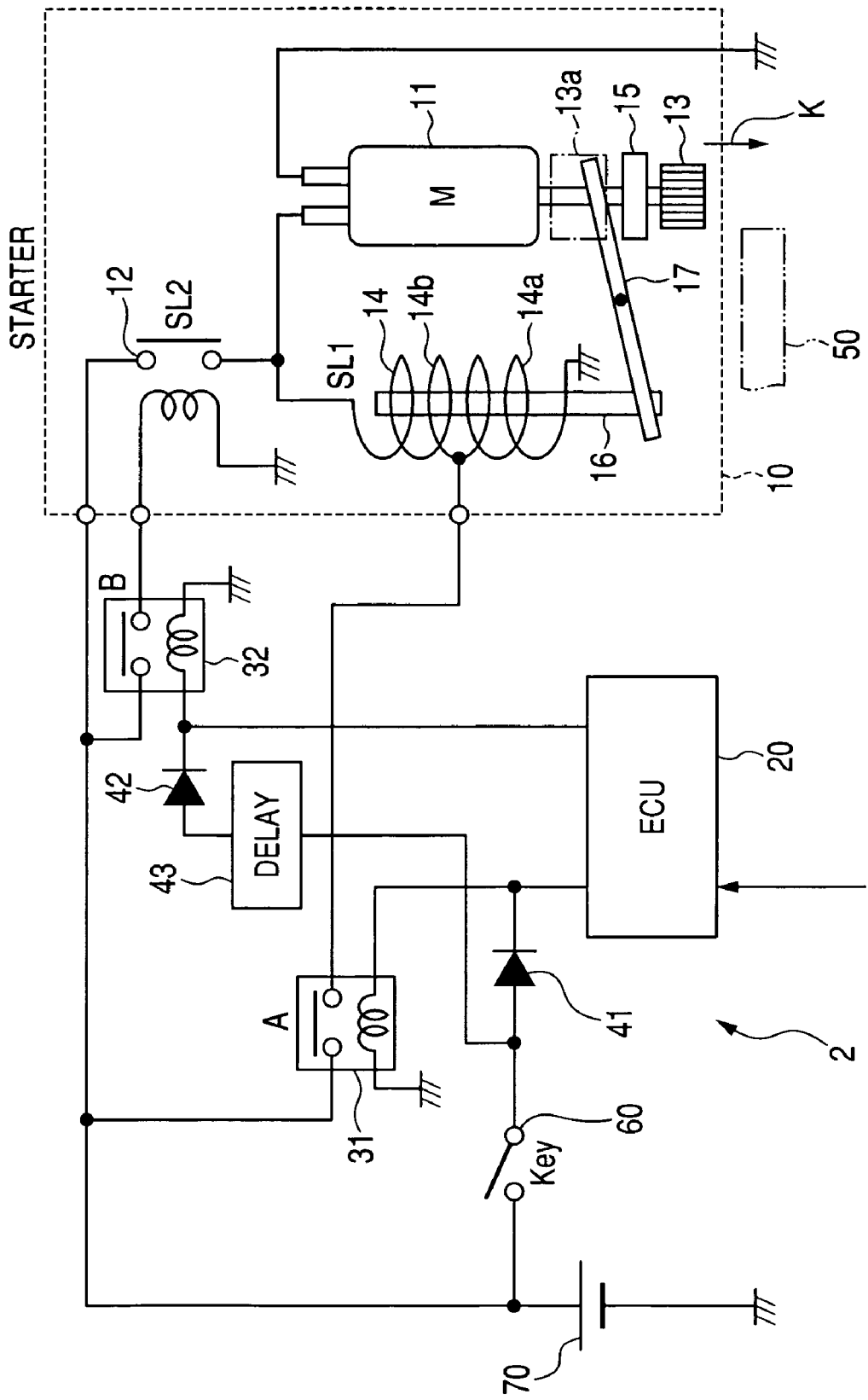
FIG. 7 is a circuit diagram which shows an engine start system according to the second embodiment of the invention.

FIG. 7 illustrates an engine start system 2 according to the second embodiment of the invention. The same reference numbers, as employed in the first embodiment, refer to the same parts, and explanation thereof in detail will be omitted here.

The A-driver relay 31 is, unlike in the first embodiment, connected electrically to the longitudinal center of the solenoid 14. Specifically, the solenoid 14 is made by an assembly of two solenoids: a first solenoid 14*a* and a second solenoid 14*b*. The second solenoid 14*b* is connected at an end thereof to a high-potential terminal of the starter motor 11 because the electric power is to be supplied to the solenoid 14 prior to supply of the electric power to the starter motor 11 through the relay switch 12.

In operation, when the A-drive relay 31 is first turned on, the electric power is supplied to both the first and second solenoids 14*a* and 14*b* to move the pinion gear 13 from the disengaged position to the engaged position. Subsequently, when the B-drive relay 32 is turned on, ends of the second solenoid 14*b* will be at the same potential, so that no current flows through the second solenoid 14*b*. Specifically, once the pinion gear 13 has reached the engaged position, the first solenoid 14*a* works to hold the pinion gear 13 at the engaged position.

The structure of this embodiment also has the same advantages as in the first embodiment.

After the B-drive relay 32 is turned on, the second solenoid 14*b* is, as described above, deenergized, while the current is kept flowing through the first solenoid 14*a*, thereby minimizing the amount of thermal energy generated by the solenoid 14. This eliminates the need for special measures to protect the solenoid 14 thermally and avoids an increase in size of the solenoid 14.

The engine start system 2 also has the delay circuit 43 disposed between the battery 70 and the B-drive relay 32 in order to launch the supply of power to the solenoid 14 prior to that to the starter motor 11 when the key switch 60 is turned on by the ignition switch.

The engine start system 1 or 2 is, as described above, designed to wait the standby time (see step 150 in FIG. 2) required to establish the engagement of the pinion gear 13 with the ring gear 50 and then output the SL2 drive command signal to actuate the starter motor 11 except for when the engine is being reversed temporarily (i.e., step 140 following a NO answer in step 120 of FIG. 2), but however, may be modified to wait until after the engine speed reaches an effective speed that is the engine speed at which the engine is to be cranked desirably or effectively and then output the SL2 drive command signal. In other words, the ECU 20 may decide whether the engine speed is lower than or equal to the effective speed or not which ensures the stability in cranking the engine. Such an additional step is provided between steps 150 and 160 of FIG. 2 to determine whether the engine speed is lower than or equal to the effective speed or not. This eliminates an unnecessary amount of electric power to be supplied to the starter motor 11, thus minimizing undesirable consumption of fuel in the vehicle.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An engine start system designed to restart an engine when an engine restart request is made before complete stop of the engine following an engine stop request, comprising:
    a pinion gear which is movable between an engaged position where the pinion gear engages a ring gear coupled to a crankshaft of an engine and a disengaged position where the pinion gear is disengaged from the ring gear;
    a solenoid which is supplied with electric power to move said pinion gear from the disengaged position to the engaged position;
    a starter motor which is supplied with electric power to rotate said pinion gear;
    a one-way clutch disposed between said starter motor and said pinion gear, said one-way clutch working to transmit torque from said starter motor to said pinion gear and block transmission of torque from said pinion gear to said starter motor; and
    a controller working to control supply of the electric power to said solenoid and said starter motor separately, when an engine restart request is made before the engine is stopped completely following an engine stop request, said controller performing a decision task, a first power supply task, a condition decision task, and a second power supply task, the decision task being to decide whether a speed of the engine is lower than or equal to a preselected gear engagable speed at which said pinion gear is engagable with the ring gear or not, the first power supply task being to supply the electric power to said solenoid when the decision task decides that the speed of the engine is lower than or equal to the preselected gear engagable speed, the condition decision task being to decide whether a standby time that is a time required by the pinion gear to engage the ring gear has elapsed or not after the first power supply task is made, the second power supply task being to supply the electric power to said starter motor when a determination is made that the standby time has expired.

2. An engine start system as set forth in claim 1, wherein when the engine has been found at a given time as being rotating in a reverse direction, said condition decision task decides whether a longer standby time that is a time longer than the standby time has elapsed or not, and wherein when it is decided that the longer standby time has elapsed, said condition decision task decides the given condition is met.

3. An engine start system as set forth in claim 1, wherein after the standby time elapses, said condition decision task is also to decide whether the speed of the engine is lower than or equal to an effective speed that is a speed of the engine at which the engine is to be cranked, when the speed of the engine is decided to be lower than or equal to the effective speed, said condition decision task decides that the given condition is met.

4. An engine start system as set forth in claim 1, wherein said solenoid is made up of a first solenoid and a second solenoid to which the first power supply task controls supply of the electric power, the second solenoid being connected at one of ends thereof to a high-potential side of said starter motor, and wherein the ends of the second solenoid are placed at the same potential by execution of the second power supply task.

5. An engine start system designed to restart an engine when an engine restart request is made before complete stop of the engine following an engine stop request, comprising:
 a pinion gear which is movable between an engaged position where the pinion gear engages a ring gear coupled to a crankshaft of an engine and a disengaged position where the pinion gear is disengaged from the ring gear;
 a pinion actuator working to move said pinion gear from the disengaged position to the engaged position;
 a starter motor which is supplied with electric power to rotate said pinion gear; and
 a controller working to control supply of the electric power to said starter motor, when an engine restart request is made before the engine is stopped completely following an engine stop request, said controller performing a decision task, a pinion moving task, a condition decision task, and a power supply task,
 the decision task being to decide whether a speed of the engine is lower than or equal to a preselected speed or not, the pinion moving task being to move said pinion to the engaged position when the decision task determines that the speed of the engine is lower than or equal to the preselected speed, the condition decision task being to decide whether a standby time that is a time required by the pinion gear to engage the ring gear has elapsed or not after execution of the pinion moving task, the power supply task being to supply the electric power to said starter motor when a determination is made that the standby time has expired.

6. An engine start system as set forth in claim 5, wherein when the engine has been found at a given time as being rotating in a reverse direction, said condition decision task decides whether a longer standby time that is a time longer than the standby time has elapsed or not, and wherein when it is decided that the longer standby time has elapsed, said condition decision task decides the given condition is met.

7. An engine start system as set forth in claim 5, wherein the preselected speed is lower than or equal to a given idle speed of the engine and greater than or equal to a minimum value of the speed of the engine which pulsates when the engine is being cranked by the starter motor.

8. An engine starter system as set forth in claim 5, further comprising an impact absorber working to absorb torque exerted on said starter motor when supplied with the electric power.

\* \* \* \* \*